UNITED STATES PATENT OFFICE.

PHILIPP EYER, OF HALBERSTADT, GERMANY, ASSIGNOR, BY MESNE ASSIGNMENTS, TO THE CHEMICAL FOUNDATION, INC., A CORPORATION OF DELAWARE.

CLOUDING COMPOSITION FOR ENAMELS AND PROCESS OF MAKING.

1,314,861.  Specification of Letters Patent.  Patented Sept. 2, 1919.

No Drawing.  Application filed November 6, 1916.  Serial No. 129,830.

*To all whom it may concern:*

Be it known that I, PHILIPP EYER, a subject of the German Emperor, and resident of Halberstadt a. H., Germany, have invented certain new and useful Improvements in Clouding Composition for Enamels and Processes of Making, of which the following is a specification.

This invention relates to the clouding of enamels and other vitreous ware and compositions therefor, and comprises particularly such enamels and compositions containing zirconium borate and zirconium oxid, preferably associated with an alkali fluorid compound, and processes of making such enamels and compositions.

The use of zirconium oxid and other zirconium compounds for producing clouding in enamels is known, but zirconium oxid has the drawback that it does not produce a uniform clouding and for that reason often produces spotted enamels. Another drawback is that enamels produced with zirconium oxid, are liable to become dull or tarnished during firing. The last named fault is a chief characteristic of tin oxid substitutes made from zirconium oxid.

Zirconium borate has been suggested as a specially suitable zirconium clouding substance. According to the experience of the applicant, it possesses, in fact this advantage over other preparations, that the enamels are not so easily liable to become spotted and dull, but on the other hand, it has a comparatively very insignificant covering capacity.

It has been found that a zirconium borate strongly supersaturated with zirconium oxid such as, for instance, a product of the composition $ZrO_2.2B_2O_3 + 4ZrO_2$ has a much greater covering capacity than ordinary zirconium borate, and at the same time does not cause the enamels to become spotted and dull. Moreover it has been found advisable in the manufacture of the preparation, to melt at the same time cryolite or a similar alkali fluorid salt, as this increases the covering capacity of the supersaturated zirconium borate.

It is true that it is known that cryolite, which is generally used as a flux in the enameling industry, can at the same time exercise a certain clouding action. Nevertheless it was impossible to foresee that the clouding capacity of the supersaturated borate prepared according to this invention, would be improved by cryolite being melted with it at the same time.

It has been found further that cheap raw zirconia can be used for the manufacture of the preparation, provided that a certain quantity of an oxidizing substance, preferably sodium nitrate, is added. This unexpectedly produces from the cinnamon brown zirconia a bright zirconium borate which during the enameling produces an irreproachable white clouding.

*Example.* 70 parts of raw zirconia, 30 parts boracic acid, 20 parts cryolite and 50 parts sodium nitrate are thoroughly mixed together, the mixture is fused and, after cooling, ground very fine. The preparation thus obtained is an excellent white clouding medium.

I claim:

1. A process of clouding enamels and the like which comprises incorporating in the enamel a composition containing zirconium and boron in combination with oxygen, the ratio of zirconium to boron being substantially greater than that existing in zirconium borate $(ZrO_2.2B_2O_3)$.

2. A clouding composition for enamels and the like comprising zirconium and boron in combination with oxygen, the ratio of zirconium to boron being substantially greater than that existing in zirconium borate $(ZrO_2.2B_2O_3)$.

3. A clouding composition for enamels and the like comprising zirconium borate supersaturated with zirconium oxid.

4. A clouding composition for enamels and the like comprising zirconium borate, zirconium oxid and an alkali fluorid compound, there being a plurality of molecules of zirconium oxid for each molecule of zirconium borate.

5. A clouding composition for enamels and the like containing boron and zirconium in combination and obtainable by fusing together about 7 parts of zirconium oxid, 3 parts of boracic acid, some cryolite and sodium nitrate, and finely dividing the cooled mass.

6. A process of making a clouding composition for enamels and the like which comprises fusing together zirconium oxid and boracic acid, the amount of zirconium oxid being substantially larger than that required to form zirconium borate $(ZrO_2.2B_2O_3)$.

7. A process of making a clouding composition for enamels and the like which comprises fusing together an alkali fluorid compound, zirconium oxid and boracic acid, the amount of zirconium oxid being substantially larger than that required to form zirconium borate $(ZrO_2.2B_2O_3)$.

8. A process of making a clouding composition for enamels and the like which comprises fusing together raw zirconia, boracic acid and an oxidizing agent, the amount of zirconia being substantially larger than that required to form zirconium borate $(ZrO_2.2B_2O_3)$.

9. A process of making a clouding composition for enamels and the like which comprises fusing together about 7 parts of raw zirconia, about 3 parts of boracic acid, about 2 parts of cryolite and 5 parts of sodium nitrate, allowing the mass to cool and finely dividing it.

In testimony whereof I have signed my name to this specification in the presence of two subscribing witnesses.

PHILIPP EYER.

Witnesses:
HENRY HASPER,
ALLEN F. JENNINGS.